United States Patent [19]

Sumrall et al.

[11] Patent Number: 5,775,022
[45] Date of Patent: Jul. 7, 1998

[54] SELF-PROPELLED WATERFOWL DECOY

[76] Inventors: Jack F. Sumrall, 2600 Chadbourne Dr., Plano, Tex. 75023; John F. Bush, Rte. 6, Box 110-B, Pittsburg, Tex. 75686

[21] Appl. No.: 660,158

[22] Filed: Jun. 3, 1996

[51] Int. Cl.⁶ .................................. A01M 31/06
[52] U.S. Cl. ...................... 43/3; 446/156; 446/158
[58] Field of Search .............. 43/2, 3, 26.1; 40/414; 446/156, 158

[56] References Cited

U.S. PATENT DOCUMENTS

| | | | |
|---|---|---|---|
| 636,106 | 10/1899 | Biddle | 446/158 |
| 1,110,245 | 9/1914 | Vaughan | 43/3 |
| 1,933,844 | 11/1933 | Davis | 43/3 |
| 2,443,040 | 6/1948 | Jones | 43/3 |
| 2,460,128 | 1/1949 | Greenleaf | 43/3 |
| 2,536,736 | 1/1951 | Gazalski | 43/3 |
| 2,645,883 | 7/1953 | Salvo | 446/158 |
| 2,648,935 | 8/1953 | Nagel | 446/158 |
| 2,704,416 | 3/1955 | Laird | 446/158 |
| 2,816,383 | 12/1957 | Locher | 43/3 |
| 2,835,064 | 5/1958 | Webb | 43/3 |
| 3,689,927 | 9/1972 | Boston | 43/3 |
| 3,785,084 | 1/1974 | Aenishanslin | 446/158 |
| 4,322,908 | 4/1982 | McCrory | 43/3 |
| 4,566,214 | 1/1986 | McCrory et al. | 43/3 |
| 4,612,722 | 9/1986 | Ferrell | 43/3 |
| 4,832,650 | 5/1989 | Tong | 446/156 |
| 5,344,357 | 9/1994 | Lyczek | 446/158 |
| 5,377,439 | 1/1995 | Roos et al. | 43/3 |

*Primary Examiner*—Michael J. Carone
*Assistant Examiner*—Darren Ark
*Attorney, Agent, or Firm*—John E. Vandigriff

[57] ABSTRACT

The invention is a self-propelled floating decoy for simulating the swimming characteristics of waterfowl. Propulsion in the water is produced by a sculling tail fin (25) which also causes a side to side rocking motion that simulates the back and head movement of a live duck paddling its feet. The decoy includes a flat base (11) with a shallow draft. The flat bottom of the base (10) is the lowest point in the water with no obstructions that would become entangled in congested water. An opening (11c) in the rear end extends through the base (11) so that an electric motor(16) driven propulsion system moves a tail fin (25) coupled to said propulsion system through the opening (11c). A decoy shell (9) representative of a water fowl is attached to the base (11). The tail fin (25) moves from side to side providing a motion to the decoy approximating the motion of a swimming water fowl.

18 Claims, 5 Drawing Sheets

_5,775,022_

SELF-PROPELLED WATERFOWL DECOY

FIELD OF THE INVENTION

The invention relates to waterfowl decoys in general, and more particularly to a self-propelled water fowl decoy which simulates a swimming water fowl.

BACKGROUND OF THE INVENTION

When live, tame ducks proved too effective in decoying wild ducks, they were banned from use in hunting. This caused hunters to revert back to traditional, static decoys. Making waterfowl decoys has been an American tradition for centuries. Decoy makers over the years have done an excellent job in producing duck decoys that approximate a live duck in shape, color, and position. These, however, lacked the realism of movement, that made live decoys so popular, especially on still waters. Later, moving decoys became popular. Though effective, when working correctly, they cause several problems for hunters. Some require that the hunter be involved with lines, pulleys, or electronic controls to maneuver the decoy. A major problem is the propulsion mechanisms used. Traditional water craft propulsion was chosen, most being propeller driven and some using a water jet. These provide movement, but were easily hung up in water with debris, limbs, or underwater vegetation, all common in areas that are used by most cluck hunters. Propellers, even when protected in a cage, tend to suck debris into its blades. Also decoys with propeller and water jet propulsion lack the realism of a swimming duck, since movement is smooth, straight, and in a predictable circular pattern. Some can be reversed or the direction changed with a remotely controlled rudder, but they still do not resemble the true way a duck swims—paddling its feet alternately. There are some variations to propeller or water jet driven decoys, like U. S. Pat. No. 4,566,214 to McCrory et al., which causes a decoy to vibrate in the water. This created some ripples in the water, but lacks the realism of a duck swimming. In another prior art, U. S. Pat. No. 4,322,908 to McCrory, movement is created with an internal motor pulling the decoy along lines set out in the water. This creates the smooth movement of propeller-driven or water jet-driven decoys, so the movement is not realistic, plus the lines are complicated to set out and pick up. There are several patents that use remote control capabilities, such as those disclosed in U.S. Pat. No. 3,689,927 to Boston and U. S. Pat. No. 5,377,439 to Roos et al. A major disadvantage to the remote controlled decoys is the need for the hunter to be holding a transmitter during the most critical time of decoying ducks. While the decoys disclosed in the above-referenced patents are believed to have some usefulness, they move like a model powerboat, not like a duck. Many require that the hunter be involved in the decoy's movement. And, they appear to lack the simplicity necessary for most hunting conditions. This complexity also impacts the cost of production and the durability necessary for duck hunting gear.

In virtually all prior art you find protrusions such as propeller and shaft, water jet, keel, rudder, etc. below the decoy. These all are traditional components of water craft for control, propulsion, stability, and steerage; but have negative aspects when applied to duck decoy movement. First, the movement is straight and smooth, not at all like a duck paddling. And more importantly, the protrusion under the decoy makes it susceptible to hanging up on foreign material common to duck habitat and hunting waters. In addition, the traditional propulsion means adds weight, complexity, adjustments, and fragile components to an activity that is typically tough on gear. Many of the prior art and current products researched require large or multiple batteries. This adds to the weight and cost, plus the hunter's inconvenience in keeping fresh batteries in the decoy. Plus, given prior art's propensity to become entangled, there is additional strain placed on the motor and batteries. So, not only does the hunter have to expose himself to free his decoy, he also may be faced with battery replacement or worse, a non-functioning motor.

Also, discovered while researching the current market were some products that have attempted to create an illusion of movement in decoy spreads. One product follows closely the previously disclosed U. S. Pat. No. 4,566,214 to McCrory et al. This product causes a vibration within a decoy shell, either in an upright swimming position or in a feeding/dabbling position. The vibration causes ripples on the water which adds a degree of realism, but lacks any swimming movement. Another product has small wing-like appendages that moves rapidly on the back of a floating decoy. There is an additional attachment that can be added to the wing devices that connects to a foot appendage. The idea is to simulate a duck on the water flapping its wings. It also stirs the water when the feet are attached. This product may have limited effectiveness, though the appearance and exaggerated movement are not similar to waterfowl. Also, in order to transport the device without harming the mechanism, the appendages cannot be added until reaching the hunting location. This is inconvenient, especially on cold, wet mornings.

Overall in researching prior art and current products on the market, it was found that swimming decoys are expensive, complicated, and not durable enough for typical duck hunting methods. Many include small precise parts, like gears, cogs, sprockets wheels with teeth meshing. It was also found that current products and prior art stay too close to tradition to effectively create realism in decoying wary ducks. The traditional propulsion devices, like propellers and water jets, do not resemble the way a duck swims. Plus, they all include some type of protrusion below the decoy that hampered a duck-like paddling or wobbling movement and, as previously mentioned, was easily entangled. Tradition was also followed with the idea that decoys need some type of keel for stability. This idea has been strictly adhered to for many years with static decoy manufacturing. To keep static decoys correctly positioned in water with a choppy wave action, with a strong current, or on a very windy day, the decoy needs a good keel or ballast, like a sailboat would need in rough seas. Swimming decoys are not needed on such waters, since the water and/or wind creates the desired decoy movement. Yet, previous art and current products are still using these methods in making swimming decoys.

Accordingly, to provide an improved waterfowl decoy, it is desirable to provide a decoy that is very simple in construction and use. That is durable enough for duck hunting. And, most importantly, overcomes the disadvantages of prior art in propulsion, realistic and random movement, and that will continue to swim, regardless of the obstacles found in duck hunting waters, without requiring the hunter's involvement.

SUMMARY OF THE INVENTION

The invention is a self-propelled floating decoy for simulating the swimming characteristics of waterfowl. The decoy includes a flat base with a shallow draft. An opening in the rear end extends through the base so that an electric motor driven propulsion system moves a tail fin coupled to said propulsion system through the opening in the rear end. A decoy shell representative of a water fowl is attached to the base. The tail fin moves from side to side providing a motion to the decoy approximating the motion of a swimming water fowl.

The present invention solves the disadvantages of the prior art set forth above with its unique propulsion method that creates a realistic duck-like swimming motion, and with its flat bottom design that allows the decoy to easily move over congested water without hang-ups. Accordingly it is an objective of this invention to create a movement on the water that closely resembles a duck swimming. The present invention provides this movement with a unique "fishtail" type propulsion. The power comes from a tail fin of flexible material that moves the decoy forward. The flexibility and resilience of the tail fin causes a fishtailing action that not only propels the decoy forward, but also causes a rocking or wobbling motion. Thus, causing the decoy to move through the water like a swimming duck would by paddling its feet. The invention is further realistic in that the clear tail fin causes a visible turbulence in the water behind the decoy that appears to be paddling feet. This turbulence is especially noticeable from a duck's perspective—in the air. The overall effect of the rocking, forward motion and the turbulence makes a very realistic impression. Further benefit is derived from the wake caused from the decoy's forward movement through still water, which is also visible from the air. The wake action is advantageous in making the hunter's other, static decoys bob up and down and look more real. This is a big improvement over the smooth movement of prior art swimming decoys. Plus, the propulsion is created in the rear of the decoy without any protrusion below the base of the decoy.

Another objective of the invention is its ability to avoid hanging up or becoming entangled, even in the debris found in most duck habitat. The invention uses a lightweight, solid mass, low density base. This base provides a flat bottom with excellent flotation. The oscillating tail fin does not protrude below the base. Thus, the decoy operates easily in even the slightest depths of water. The shallow draft provides a number of advantages. The primary benefit is the ability to swim over most obstacles without becoming hung-up, grounded, or entangled in debris located in the water. This overcomes the disadvantage of all of the prior art that uses a propeller or water jet method of propulsion, or that have keels or rudders as part of their construction. Another advantage is that the flat bottom provides a random pattern to the decoy's movement which adds to the realism. This improves over prior art's circular, predictable pattern. The flat bottom design allows all of the metallic and electronic parts of the decoy to be housed above the water line. The only two parts that are actually in the water during operation are the base and the tail fin, both of which are made of non-corrosive material. Previous art was susceptible to corrosion due to the metallic parts that were in the water, like the propeller and drive shaft. Also discovered in prior art are parts that are inside the decoy, but located below the waterline of the decoy. Any seepage or leaks exposes these parts to corrosion.

In addition to the invention's ability to avoid underwater entanglements, there is a major advantage derived from the invention's propulsion method and base design in remaining free from water level hazards also. The advantage is the invention's ability to maneuver past most obstructions. As opposed to prior art and current products with traditional propulsion, this invention is not stopped when encountering an obstruction on the water like a limb, log, or tree. The rocking motion causes the invention to quickly work past an obstruction, even if the obstruction is met head-on. One criteria of the invention is to be able to use it in even the most congested waters. Many times still water is shallow and contains large amounts of vegetation and/or debris. As previously mentioned, the invention has an advantage in such water over previous art, because of its shallow draft and Light weight. However, in very congested water, the line that anchors or tethers the decoy can also become entangled. Thus, another major advantage of the invention is the ability to use the decoy with means other than traditional tethering. One example would be the use of a floating line affixed from the decoy to a swivel device on the water's surface. The swivel can be attached to an anchored float or to a pole if the water is shallow. Another approach would eliminate the need to tether the decoy at all. Hollow tubing, such as a small hose or gasoline line, could be tethered in the water in a circular pattern. The decoy would be placed inside the enclosure and allowed to swim non-tethered. Upon meeting the tubing the decoy would alter its course by moving off the obstruction in a new direction. Thus, the invention's unique characteristics make it usable in virtually all water conditions. This is a major improvement over prior art that requires uncluttered water for continued operation. Such water conditions are not always available. Plus, water heavy with edible vegetation is an attraction to ducks, and thus, a preferred location for a duck hunter's decoys. The invention has been used effectively in such water by submerging a small plastic wading pool into the heavy growth. The preferred pool is a semi-rigid plastic with a curved lip around the edge. The smaller variety of these pools are easily carried, though somewhat cumbersome. The pool is quickly submerged by tilting an edge under water and pushing down. The weight of the water causes the pool to sink into the heavy vegetation. Even when completely full of water, the pool floats with a small portion of the lip above water. This exposed lip provides the same obstruction as described above with the tubing and the decoy maneuvers around in the same manner. This method has also proven effective in water congested with ice.

Another objective of the invention is to keep weight to a minimum. This has been accomplished with the present production model's weight. There are several advantages to the light weight. The invention is easily carried and could be stored in a decoy sack without adding to the hunter's burden. Another advantage of the light weight and shallow draft is that the energy required to drive the tail fin is low. Thus, little strain is placed on the electric motor. This prolongs the life of the motor and ensures many hours of operation from the battery. This is a major improvement over prior art. In prior art and current products, the weight of the decoy and the drag created by the underwater protrusions places additional strain on the motor and power supply, even in clear water.

Another objective of the invention is simplicity of operation. The invention is powered by one AA battery. The battery holder is located beneath the decoy shell which is easily removed from the base by depressing a latch. With battery in place, operation is started and stopped with a switch. In most water, the invention can be anchored and tethered like a traditional decoy. The hunter need only put out the invention like a standard, static decoy and turn on the switch. Nothing else requires the hunter's involvement. His hands are free. There is nothing to control, no ropes or lines, no adjustments, no steering mechanism, no appendages to add, no speed settings. The hunter is completely free and motionless to concentrate on watching for waterfowl. This improves on prior art. Some prior art and current products require tools to change the battery. Some prior art requires that the hunter be involved with the operations of the decoy through transmitting signals or pulling on lines. Some prior art requires speed and rudder adjustments for velocity and direction control.

Another objective is reliability. This has been accomplished in several ways. The invention requires one small battery that can power the motor for many hours and several hunts. The preferred electric motor has been stepped down to a relatively slow RPM and has a predicted life of several thousand hours of operation. The preferred motor is durable, sealed, and waterproof. The load placed on the motor to propel the decoy is well below the manufacturer's specification. There is a minimum of moving parts converting the electric motor's rotary motion to the fishtailing or reciprocating motion of the tail fin. There are only two points of friction or wear on the moving parts. The decoy's weight and shallow draft place minimal strain on the motor. The invention's mechanical and electrical parts are all enclosed and protected by the decoy shell. They are also above the waterline of the decoy keeping them free from seepage. The only two parts that come in contact with the water (base and tail fin) are non-corrosive material. The mechanical components are easily accessible without tools. The battery can be changed in seconds. There are no settings other than the ON/OFF switch. Previous art was complex in design, construction, and operation. These factors impacted the reliability and durability of the decoys disclosed in previous art.

Another objective is to keep the cost of manufacturing the invention low enough that a profit can be made, while offering the hunter an affordable price. This invention uses conventional components combined in a unique fashion. Current production of the invention has a low cost of raw materials, which are easily obtained. The decoy shell is procured from a well known decoy manufacturer. The electric motor is a multi-use and readily available product from a quality manufacturer. The remainder of the raw materials are available at numerous hardware and electronic stores. Assembly of the invention requires tools and machines found in most shops. The labor to build the invention requires moderate skills, but not uncommon in the manufacturing industry. Previous art and current products are expensive. Some use elaborate electronics. Others are less expensive, but are fragile and lack function.

Accordingly, one will see that this invention resembles the movement of a swimming duck much better than anything disclosed in previous art. The invention's propulsion means provides an enhanced and unexpected result in creating a duck-like wobble in it's forward motion. The flat bottom design and shallow draft of the invention keeps the decoy from unplanned stoppages, so that the hunter is able to stay uninvolved and concealed. The random, duck-like movement and tangle-free operation are the major functional advantages over the decoys disclosed in prior art. Also important to duck hunters is the invention's simplicity and durability.

Although the descriptions above contains many specificity's, these should not be construed as limiting the scope of the invention, but as merely providing illustrations of the preferred embodiment of this invention. For example, the invention can resemble any number of duck or goose species by simply using another decoy shell. There are many species available in today's decoy market. The uses described are pertinent to the waterfowl hunter. However, there are many additional uses-such as, waterfowl photography, bird watching, waterfowl entrapment, and waterfowl banding. In addition, the invention could be used to aesthetically enhance landscape ponds, swimming pools, or fountains.

Another ramification of this invention is the ability it has to pull a slave decoy. There is enough power generated by the propulsion system to attach a non-swimming decoy to the invention and have it pulled. The aforementioned advantages regarding the inventions tangle-free operation keep the swimming decoy from tangling with the line attached to the slave.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF A PREFERRED EMBODIMENT

Figure 1:
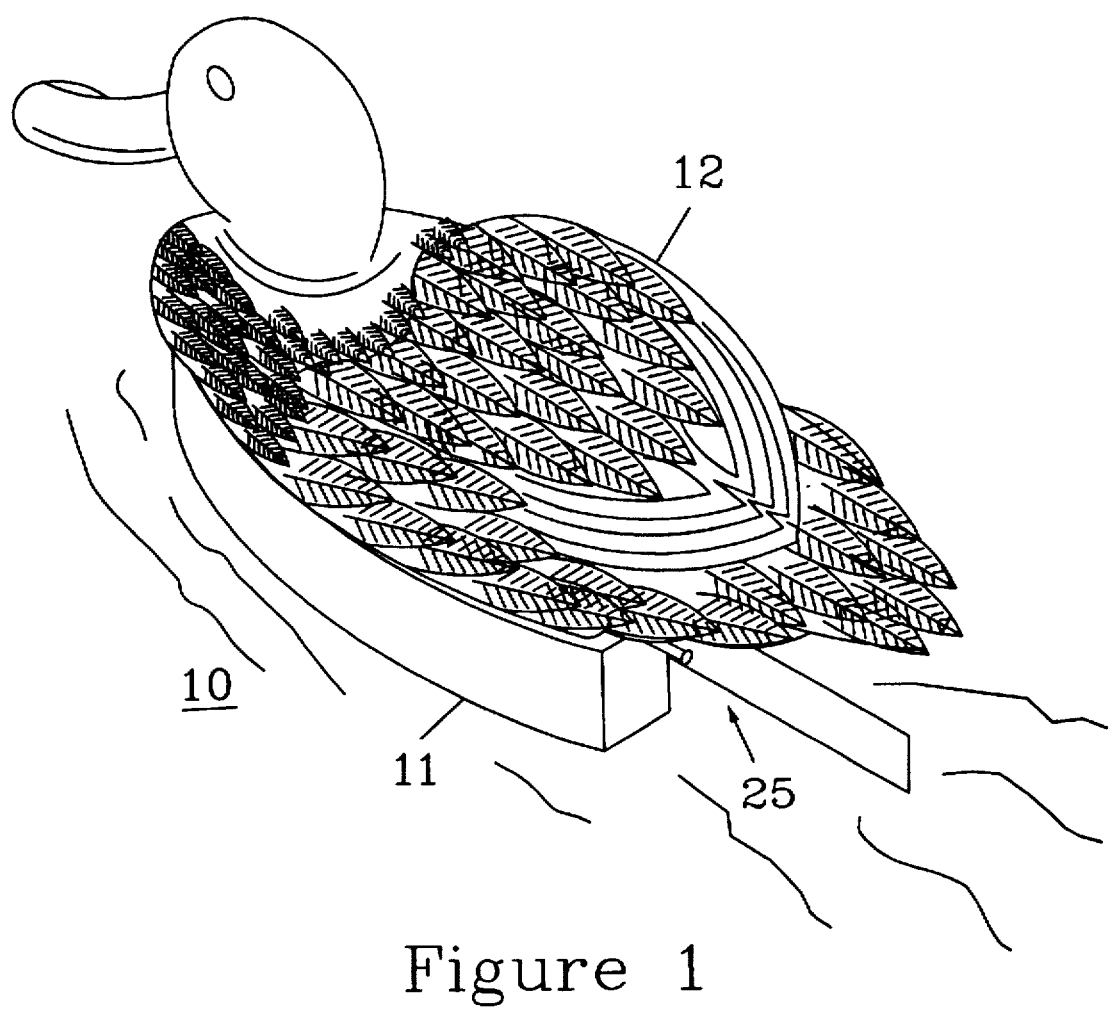
FIG. 1 shows an isometric view of a water fowl decoy of the present invention.

FIG. 1 shows a floating self-propelled decoy of the invention. Decoy 10 has a flotation base 11 upon which the simulated water fowl shell 12 is mounted. Base 11 includes a platform, described below, on which a propulsion system is mounted. An oscillation tail fin 25 is used to provide the life-like motion of the decoy.

Figure 2:
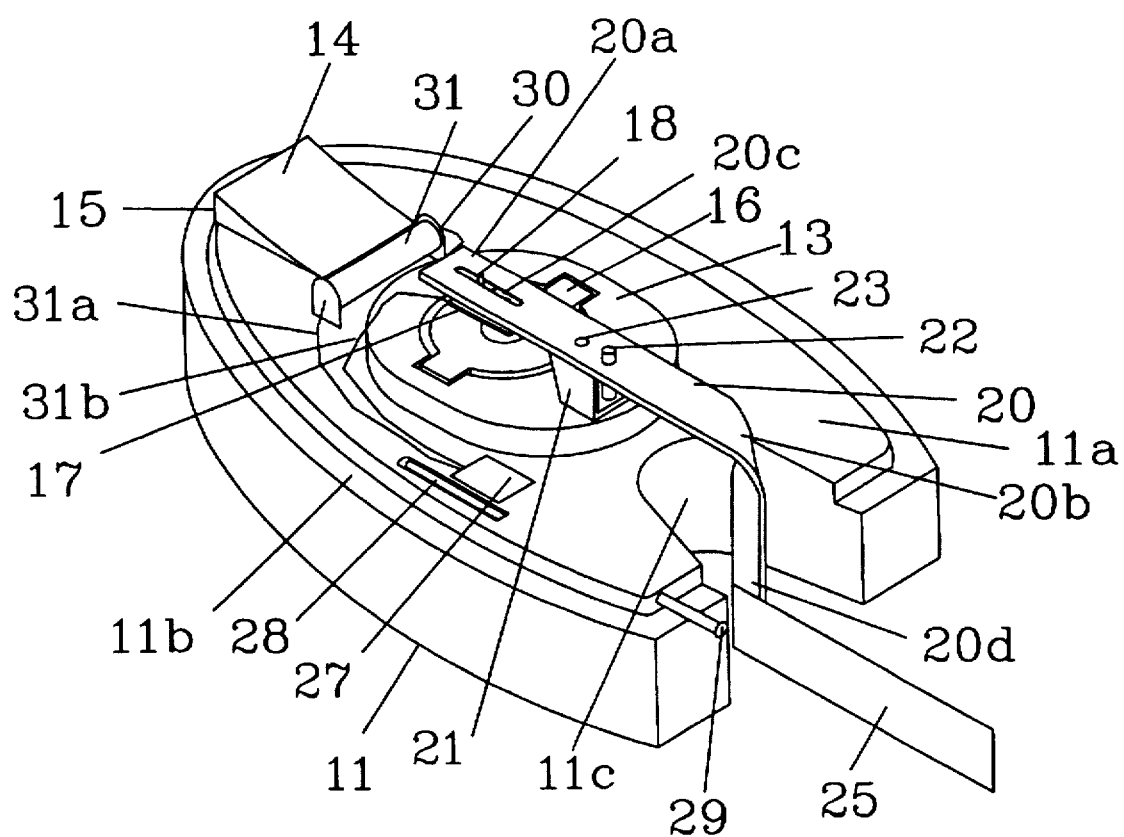
FIG. 2 is an isometric illustration of the flotation base and motion producing apparatus.

Base 11 is composed of a solid mass of low density material to provide maximum flotation at shallow draft. Base 11 is adapted to provide flotation and support for the propulsion system and a variety of decoy shells 12. The preferred embodiment for the decoy shell 12 is the mallard species, but could represent any number of duck or goose species. FIG. 2 shows base 11 and the propulsion system that is powered by an electric motor 16 recess mounted in the surface 11a of base 11. Base 11 is thick enough to provide adequate flotation, to house electric motor 16 and the rest of the propulsion system, and to provide the attachment for decoy shell 12. Base 11 has a grooved edge 11b around the top edge of base 11 to provide a precise fitting with decoy shell 12. In addition to grooved edge 11b, a mounting plate 26 (FIG. 3) provides a tail latch 32 to attach decoy shell 12 to base 11.

Platform 13 may be an integral part of base 11 or may be a separate part. Electric motor 16 is recessed into platform 13, and the propulsion system used in conjunction with motor 16 is mounted on platform 13. Electric motor 16, for example, is a low voltage, sealed, and waterproof motor. Motor 16 may be a low voltage DC motor with internal gear reduction to provide a speed of 50–70 RPM.

Power to motor 16 is a battery 31 mounted in battery mount 30. Switch 27 is attached to motor 16 and battery 31 by wires 31a and 31b. Switch 27 is actuated by switch actuator 29 which extends through tube 28 from the back of base 11. Switch 27 may be encapsulated to provide a water proof cover for switch 27.

Attached to electric motor 16, is crank 17 and crank pin 18. Crank 17 is mounted on the shaft 16a (FIG. 5) of motor 16 and rotates when power is supplied to motor 16. Crank pin 18 is off-set mounted on crank 17 such that the axis of rotation, shaft 16a, is not in the center of crank 17. Crank pin 18 is mounted on and adjacent to the opposite end of crank 17 from which shaft 16a or the axis of rotation is located. As shaft 16a rotates, crank pin 18 rotates in a circle around the axis of rotation of shaft 16a.

To provide a reciprocating motion to tail fin 25, conversion arm 20 is pivotally attached to conversion arm support 21 mounted on shaft 22. Conversion arm support 21 freely rotates on shaft 22. Arm 20 is secured to conversion arm support 21 by a screw or rivet 23. End 20a of arm 20 has a slot 20c through which crank pin 18 extends. As motor 16 turns, crank pin 18 moves along slot 20c as crank pin 18 rotates in a circle. The rotating motion and movement of crank pin 18 in slot 20c causes end 20a of arm 20 to oscillate back and forth about shaft 22. The oscillating motion of arm 20 causes end 20d to move in an oscillating motion in opening 11c of base 11. This motion causes tail fin 25 to move from side to side, propelling the decoy 10.

Arm 20 is formed at approximately a 90 degree angle at location 20b to cause end 20d to extend downward. Tail fin 25 is attached to end 20d by screws or rivets.

In the front end of base 11 is stationary latch 14, the end of which extends over groove 11b. The decoy shell 12 extends over and slightly under end 15 of stationary latch 14 to secure front of decoy shell 12 to base 11.

Figure 3:
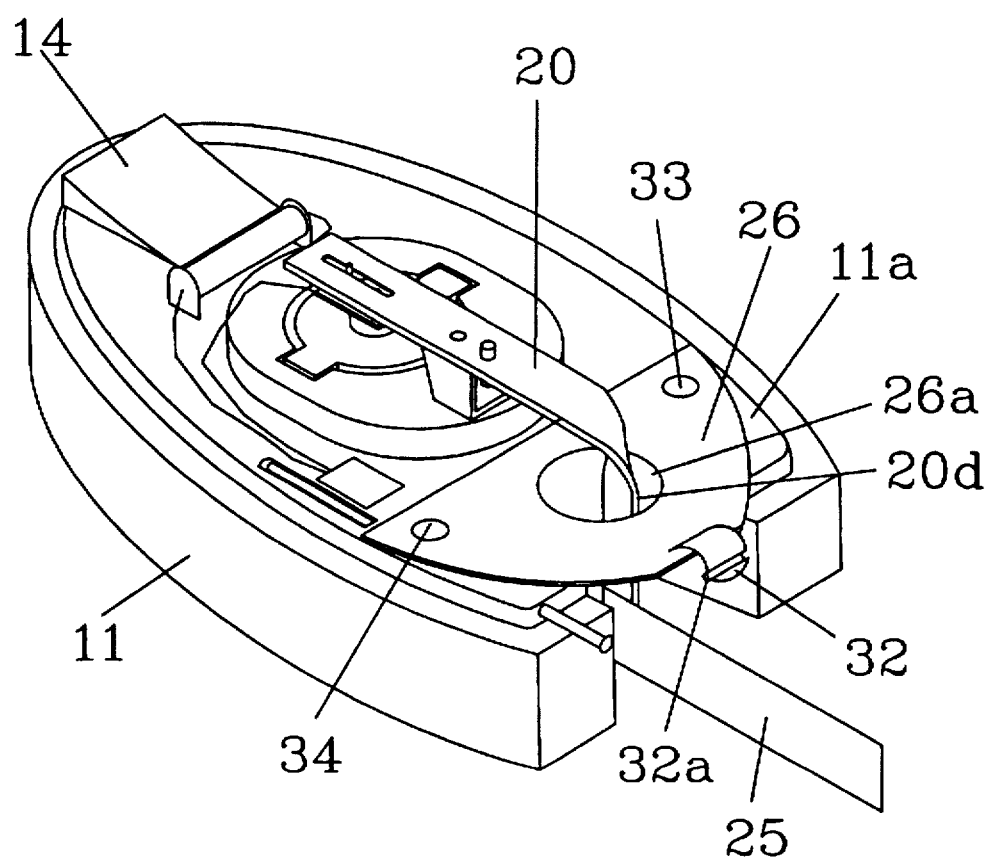
FIG. 3 is an illustration as in FIG. 2 with the addition of a cover plate with a clip for attaching the water fowl shell.

FIG. 3 shows base 11 with a latch plate 26 secured to surface 11a. Plate 26 is secured to base 11 by two or more screws, for example, screws 33 and 34. Plate 26 has an opening 26a through which end 20d of arm 20 extends. Latch 32, with latch groove 32a is attached to plate 26. Latch 32 secures the back end of the decoy shell 12 to base 11. Latch 32 and stationary latch 14 secure decoy shell 12 to base 11. By depressing latch 32, decoy shell 12 can be easily removed from base 11. Plate 26 provides a partial closure to opening 11c to prevent water from entering the decoy and wetting the propulsion mechanism, including motor 16.

Figure 4:
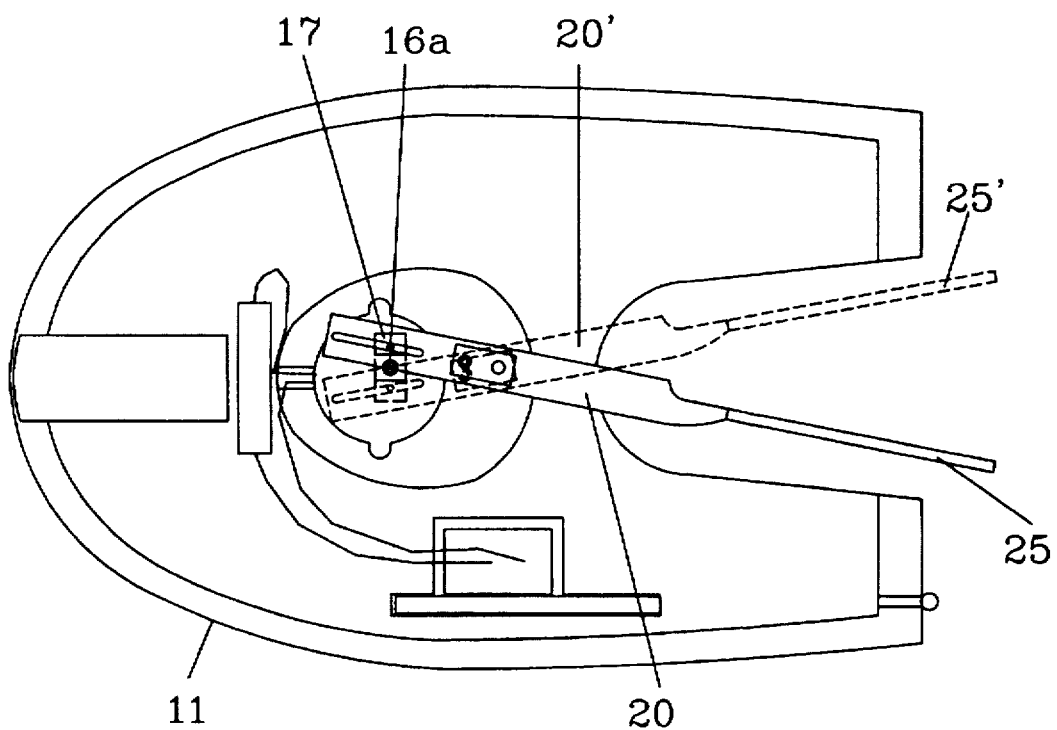
FIG. 4 is a top view of the flotation base and motion producing apparatus.

FIG. 4 is a top view of base 11 showing arm 20 of the propulsion system in two locations. Arm 20 is shown positioned with tail fin 25 at one extreme position to one side, and arm 20' shows tail fin 25' at the opposite extreme position. Tail fin 25 oscillates from one position to the other providing a forward motion to the decoy. Crank 17 rotates around motor shaft 16a.

Tail fin 25 is made of a thin, resilient material, for example, a 0.020 inch thick polycarbonate sheet. The combination of the oscillating movement of the conversion arm 20 and tail fin 25, plus the fish tailing or partial bending of tail fin 25 in the water causes decoy 10 to move. As arm 20 begins its movement in one direction, the rear portion of tail fin 25 bends or bows in the other direction against the resistance of the water. This curve increases in tail fin 25 until the direction is reversed, at which point the bowed/bent portion of tail fin 25 whips back and moves in the new direction creating a new bend, curving the opposite way. Thus, as arm 20, and front end of tail fin 25 oscillates back and forth, the rear of tail fin 25 fish tails. The direction moved by decoy 10 is generally forward, but with enough side to side, yaw-like movement to create the desired rocking and wobbling motion that makes the decoy appear realistic as a swimming duck.

Figure 5:
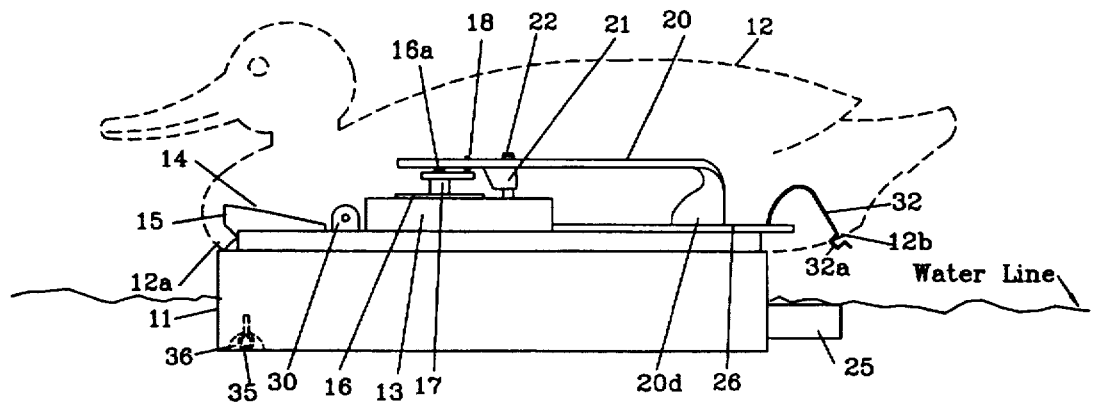
FIG. 5 is a side view of the flotation base and motion producing apparatus.

FIG. 5 is a side view showing base 11 with decoy shell 12 shown in dashed lines. Decoy shell 12 is secured to base 11 at the decoy head end by a portion 12a of decoy shell 12 extending under end 15 of stationary latch 14. At the back of decoy 10, a portion 12b of decoy shell 12 is held fastened down by groove 32a of latch 32. To remove decoy shell 12, latch 32 is pressed downward moving groove 32a away from the rim of decoy shell 12 releasing the end of decoy shell 12 allowing decoy shell 12 to be lifted from base 11.

FIG. 5 shows a clear side view of the propulsion mechanism. Crank 17 is mounted on shaft 16a of motor 16. Crank pin 18 is shown extending up from one end of crank 17, and extending through arm 20. Arm 20 is shown mounted on conversion arm support 21 that is spaced above platform 13 on shaft 22. Shaft 22, extends up through conversion arm support 21. Conversion arm support 21 is rotationally mounted on shaft 22.

In the bottom of base 11 is the anchor eyelet 35. Anchor eyelet 35 allows the attachment of a swivel which attaches a line that connects to an anchor weight (not illustrated) when the decoy is tethered. Anchor eyelet 35 is counter sunk into opening 36 of base 11 so that it does not protrude below the base 11. This lessens the possibility for entanglement whether the decoy is used with or without tethering.

Decoy shell 12 is a hollow, light weight, plastic representation of a duck or goose species with the bottom removed from the original manufacturer's design.

What is claimed is:

1. A self-propelled floating decoy for simulating the swimming characteristics of waterfowl, comprising:

a base, having front and rear ends, for flotation;

an opening in the rear end which extends through the base;

an oscillatory propulsion system;

a single oscillating flexible tail fin, coupled to said propulsion system, extending through and beyond the opening in the rear end for propelling the decoy in water in a wobbling duck-like motion; and a decoy shell representative of a waterfowl secured to said base.

2. The floating decoy according to claim 1, wherein said base has a groove in which said decoy shell is secured to the base.

3. The floating decoy according to claim 1, wherein said base has a flat surface bottom below which no part of the decoy extends.

4. The floating decoy according to claim 1, wherein said propulsion system includes an electric motor having a rotating shaft, an elongated rotation plate off-set mounted on the rotating shaft such that the plate is attached adjacent a first end of said rotation plate, and a pin mounted adjacent a second end of said rotation plate.

5. The floating decoy according to claim 4, including an arm having an elongated slot therein is placed over said pin such that said pin moves in said elongated slot, and a tail fin attached to said arm such that when the electric motor rotating shaft is turning, the tail fin will move from side to side.

6. The floating decoy according to claim 1, including a fixed latch on the front of the base and a movable leaf spring latch, having an offset region, on the rear end of the decoy, wherein the decoy shell is secured to the base by said fixed latch and movable leaf spring latch.

7. The floating decoy according to claim 1, wherein said tail fin is mounted such that it does not extend below the base.

8. The floating decoy according to claim 1, including a reed switch and a battery interconnect with said electric motor for providing power to and switch on and off power to said electric motor.

9. The floating decoy according to claim 8, wherein said reed switch is actuated by a shaft extending partially through and out the rear end of said base.

10. The floating decoy according to claim 1, including a cover plate over a part of the rear end of said base, and having an opening therein through which a part of said propulsion system extends to actuate said tail fin.

11. A self-propelled floating decoy for simulating the swimming characteristics of waterfowl, comprising:

a base, having front and rear ends, for flotation;

an opening in the rear end and extending through the base;

an oscillatory propulsion system;

a single oscillating flexible tail fin coupled to said propulsion system, extending through and beyond the opening in the rear end for propelling the decoy in water in a wobbling duck-like motion;

a decoy shell representative of a waterfowl secured to said base; and a fixed latch on the front of the base and a flexible notched movable latch on the rear end of the decoy, wherein the decoy shell is secured to the base by said fixed and movable latches.

12. The floating decoy according to claim 11, wherein said base has a groove in which said decoy shell is secured to the base.

13. The floating decoy according to claim 11, wherein said propulsion system includes an electric motor having a rotating shaft, an elongated rotation plate off-set mounted on the rotating shaft such that the plate is attached adjacent a first end of said rotation plate, and a pin mounted adjacent a second end of said rotation plate.

14. The floating decoy according to claim 13, including an arm having an elongated slot therein which is placed over said pin such that said pin moves in said elongated slot, and said tail fin is attached to said arm such that when the electric motor rotating shaft is turning, the tail fin will move from side to side.

15. The floating decoy according to claim 11, wherein said tail fin is mounted such that it does not extend below the base.

16. The floating decoy according to claim 11, including a reed switch and a battery interconnect with said electric motor for providing power to and switch on and off power to said electric motor.

17. The floating decoy according to claim 16, wherein said reed switch is actuated by a shaft extending partially through and out the rear end of said base.

18. The floating decoy according to claim 11, including a cover plate over a part of the rear end of said base, and having an opening therein through which a part of said propulsion system extends to actuate said tail fin.

* * * * *